Aug. 7, 1951  R. COLOMBO  2,563,396
METHOD AND APPARATUS FOR MANUFACTURING
BY EXTRUSION STRUCTURAL MEMBERS FROM
THERMOPLASTIC SYNTHETIC RESINS
Filed Aug. 7, 1947  2 Sheets-Sheet 1
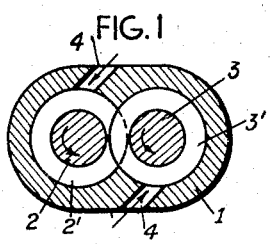
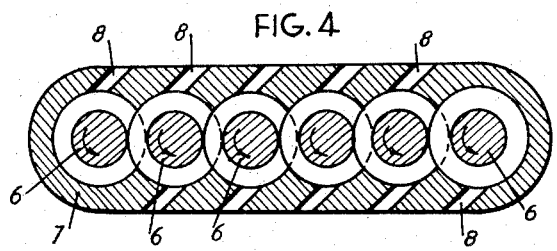
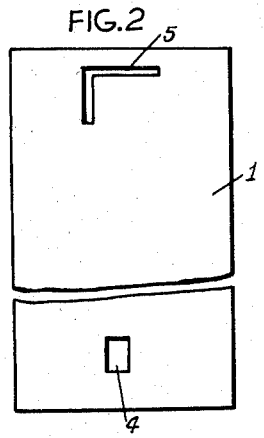
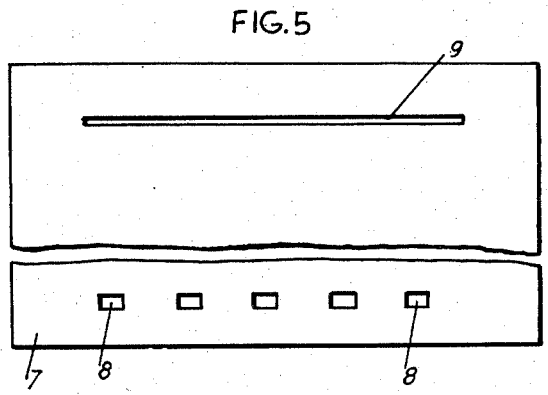
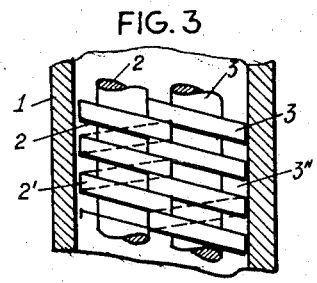
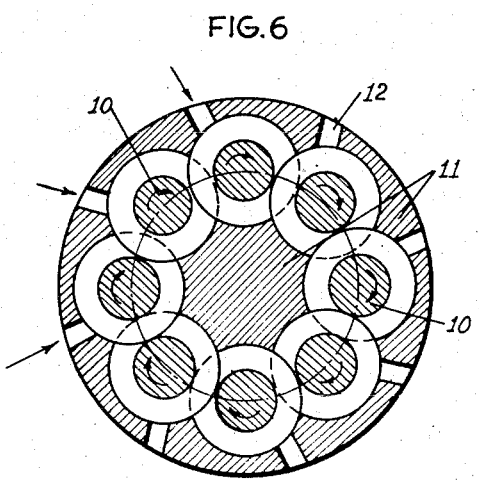
Inventor
ROBERTO COLOMBO
By Haseltine, Lake & Co.
Agents

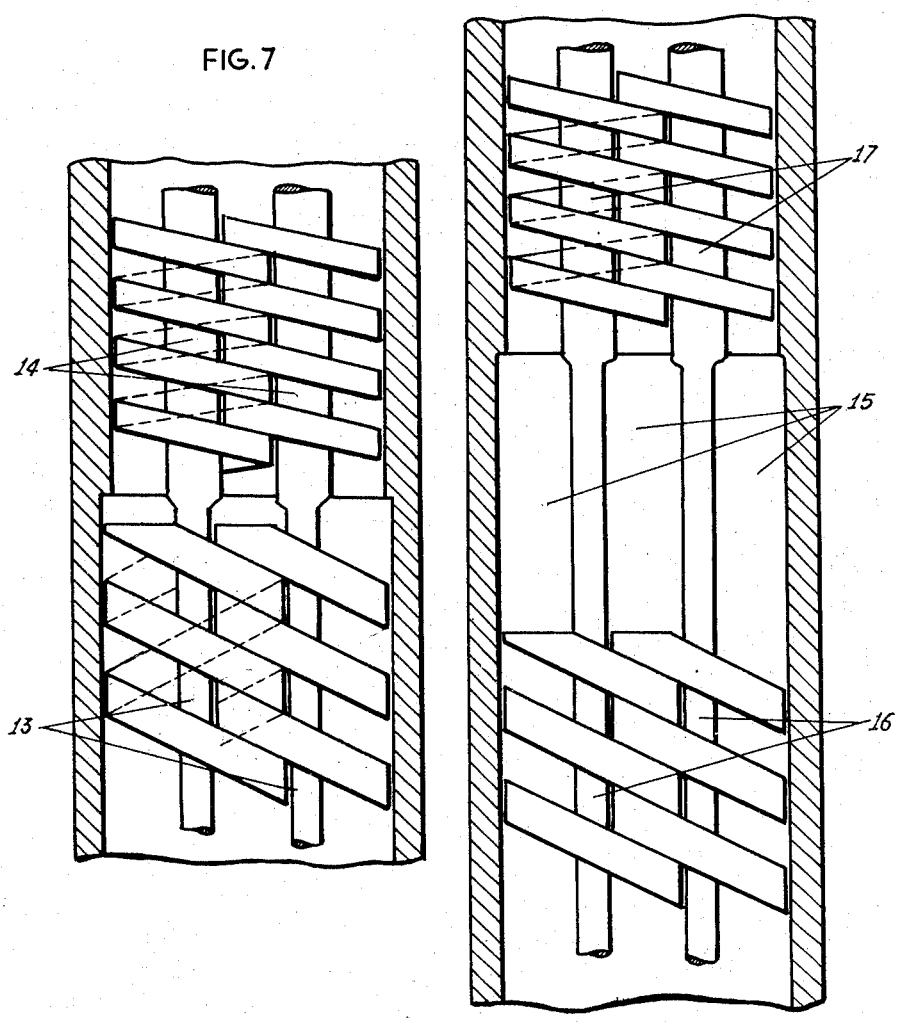

Patented Aug. 7, 1951

2,563,396

UNITED STATES PATENT OFFICE 2,563,396

METHOD AND APPARATUS FOR MANUFACTURING BY EXTRUSION STRUCTURAL MEMBERS FROM THERMOPLASTIC SYNTHETIC RESINS

Roberto Colombo, Turin, Italy, assignor to Liguna S. A., Zurich, Switzerland

Application August 7, 1947, Serial No. 766,912
In France February 2, 1940

Section 1, Public Law 690, August 8, 1946
Patent expires February 2, 1960

4 Claims. (Cl. 18—12)

This invention relates to screw presses employed in the manufacture by extrusion of articles of plastic materials, and its object is to provide means for obtaining in said articles a compact and homogeneous structure free from porosities.

According to this invention I employ at least two intermeshing screws rotating in the same direction and such as to effect, besides mixing of the material, an increment in pressure.

In a first construction of the object of my invention, this is obtained by making the screws of gradually decreasing diameter, the section of larger diameter being of course on the feed side.

In order to further increase the compression of the material in the space between the threads of both screws, the various sections may be of different pitch, so that if in the first section there is for example 1 turn per inch, in the second section there will be 1½ turns per inch and so on, thus obtaining a gradually increasing compression. Generally, the material remains in the screw casing only the strictly necessary time for its advancement along the screw threads, such time being so controlled that the material reaches a fully molten state. In some cases it may be necessary for the material to undergo, after melting, a prolonged baking inside the casing. In this case a chamber of a certain volume is provided in the casing; the material advances slowly in said chamber and is thus submitted to the necessary baking.

The annexed drawing shows, by way of example, some embodiments of the apparatus according to this invention.

Figures 1 and 2 are a cross section and a plan view respectively of an apparatus in its simplest form constituted by two interengaging screws.

Figure 3 is a part longitudinal section of the interengaging screws.

Figures 4 and 5 are a cross section and a plan view respectively of an arrangement comprising six screws placed side by side and having interengaging threads, suitable for the manufacture of sheets or structural members of considerable width.

Figure 6 shows an embodiment, in which the engaging screws are circularly arranged. This construction is more particularly adapted for the manufacture of tubes of large diameter.

Figures 7 and 8 show improved constructions adapted for particular cases.

Referring to the drawing, 1 is the body of the apparatus having a recess in which are located, as shown in Fig. 1, two screws 2, 3 with parallel axes and interengaging threads 2′, 3′. The screws are rotated in the same sense each by means of a separate driving mechanism not shown for clearness sake.

The material is filled into the space 2″, 3″ (Fig. 3) between the threads through the feed openings 4 and is advanced along each screw, owing to the fact that the thread of the other screw closes said space with a sufficient tight fitting to prevent the material from turning with the screw. The thread of one of the screws serves to stop advancement of the material filling the clearance between the threads of the other screw. It will be easily understood that, when starting from material of high specific volume, the screw threads would not always be filled with material thus reducing efficiency. It is therefore necessary to use screw sections 13 and 14 (Fig. 7) having threads of different diameter and, if necessary, also of different pitch, so that the material is admitted to the first section of larger diameter and higher pitch at a higher specific volume and fed into the second section in a slightly compressed state and so on in the following sections at gradually increased pressure.

The material is thus forced to advance under high pressure and, as it has been ascertained in the practice, a thorough mixing of the material is obtained. The material is pressed from the space at the screw end by the newly fed material towards the die opening 5 which may for instance be of the shape shown in Figure 2. In the modified form shown in Figures 4 and 5, a set of screws 6 is mounted in the casing 7 having feed openings 8 for each screw 6. 9 denotes the die opening, which may be of elongated form for producing a sheet as shown in the drawing.

In the modified construction shown in Figure 6, the screws 10, instead of being arranged in a row, as shown in Fig. 4, are arranged on a closed ring in a casing 11 provided with an opening 12 for each screw.

In this construction the drawing die opening may be formed in a surface perpendicular to the screw axis, for instance in the form of an annular slot for producing tubes of ordinary and larger diameter, while tubes of smaller diameter may also be produced on the apparatus shown in Figures 1 and 2.

According to the invention, the smooth and compact material issuing in a highly compressed state from the drawing die may be led by means of suitably shaped surfaces arranged in proximity to the die opening in such manner as to wind the drawn material on a plane, for instance in spiral form or in space, for instance in helical form.

By using a die aperture having the shape of the ordinary metal structural members used in the manufacture of metal hoses, it will be possible to obtain such a structural member of thermoplastic material which, guided by suitable templates while in the soft state may be directed along a helical path. The blank may be transformed on a suitable mandrel into a hose of thermoplastic material, the structural member being spirally wound with superposed turns in a single continuous operation starting from feeding the thermoplastic material and ending with the winding of the structural member issuing from the drawing die in the spiral form, thus producing a hose.

The apparatus according to the invention may also be used for manufacturing structural members of heat hardened materials. The material fed through the feed opening is admitted under pressure into the casing at room temperature or, if necessary, is cooled and passes into the drawing die, which may be of any suitable form, heated to such a temperature that the material melts and then is hardened to a well defined form corresponding to the die form.

When using heat hardening material it is possible to obtain, by using the screw propulsion means, according to the invention, structural members of substantial size, which would otherwise be possible only by expensive methods. In fact, if a heat hardening material is fed under high pressure into a recess having the shape of the member to be produced and fresh material is continually fed and the die is slightly heated, the material begins to melt, its volume being reduced and continually restored by the fresh material pressed into the apparatus. Before hardening the material is highly compressed so that it fills completely the recess.

The arrangement may be used for the manufacture of aeroplane screws.

Fig. 8 shows a modified construction to be used when the material should undergo besides melting a prolonged baking. In this case a non-threaded section 15 is interposed between a section 16 of large diameter and high pitch and a section 17 of smaller diameter and lower pitch. A chamber is thus formed at section 16 the volume of which is far greater than that of a threaded section of equal length; the material pressed into said space by the material in section 15 advances therefore slowly and undergoes the necessary baking before being pressed into section 17 and drawing die.

Obviously the last step of this method may be adopted for thermoplastic materials treated with solvents, although it does not appear convenient as in the first step of the method according to this invention a better, more compact and finished material is already obtained from the drawing die thus reducing the cost of manufacture.

The arrangement according to this invention may be advantageously used for metals having a low melting point and for hard rubber.

What I claim is:

1. An apparatus for manufacturing by extrusion structural members from thermoplastic synthetic resins comprising intermeshing screws having parallel axes all arranged to rotate in the same direction in which the thread of each screw completely fills the spaces between the threads of the screw or screws intermeshing with the same, a container confining said screws and fitting the outer perimeters thereof, means for driving said screws, the threads of said screws having a decreasing pitch and diameter from said inlet to said outlet opening, inlet openings to said screws in container, an outlet opening from said screws in said container, and a forming die in said outlet opening.

2. An apparatus for manufacturing by extrusion structural members from thermoplastic synthetic resins comprising intermeshing screws having parallel axes all arranged to rotate in the same direction in which the thread of each screw completely fills the spaces between the threads of the screw or screws intermeshing with the same, a container confining said screws and fitting the outer perimeters thereof, means for driving said screws, the threads of said screws having a decreasing pitch and diameter from said inlet to said outlet opening, each screw comprising an intermediate non-screwed section, on which section the container is of the same outline as on the preceding screwed section, the container being sharply reduced after the smooth section to the smaller diameter of the successive screwed section, inlet openings to said screws in said container, an outlet opening from said screws in said container, and a forming die in said outlet opening.

3. An apparatus for manufacturing by extrusion structural members from thermoplastic synthetic resins comprising a plurality of intermeshing screws having parallel axes lying in the same plane, and all arranged to rotate in the same direction in which the thread of each screw completely fills the spaces between the threads of the screw or screws intermeshing with the same, a container confining said screws and fitting the outer perimeters thereof, means for driving said screws, the threads of said screws having a decreasing pitch and diameter from said inlet to said outlet opening, inlet openings to said screws in said container, an outlet opening from said screws in said container, and a forming die in said outlet opening.

4. An apparatus for manufacturing by extrusion structural members from thermoplastic synthetic resins comprising a plurality of intermeshing screws having parallel axes lying on a cylindrical surface, and all arranged to rotate in the same direction in which the thread of each screw completely fills the spaces between the threads of the screw or screws intermeshing with the same, a container confining said screws and fitting the outer perimeters thereof, means for driving said screws, the threads of said screws having a decreasing pitch and diameter from said inlet to said outlet opening, inlet openings to said screws in said container, an outlet opening from said screws in said container, and a forming die in said outlet opening.

ROBERTO COLOMBO.

REFERENCES CITED

The following references are of record in the file of this patent:

UNITED STATES PATENTS

| Number | Name | Date |
|---|---|---|
| 72,393 | Hale | Dec. 17, 1867 |
| 1,156,096 | Price | Oct. 12, 1915 |
| 1,831,779 | MacDonald | Nov. 10, 1931 |
| 2,048,286 | Pease | July 21, 1936 |
| 2,119,162 | Hartner | May 31, 1938 |
| 2,360,984 | Schmitz, Jr. | Oct. 24, 1944 |

FOREIGN PATENTS

| Number | Country | Date |
|---|---|---|
| 180,638 | Great Britain | Apr. 8, 1922 |
| 397,961 | Germany | June 28, 1924 |
| 373,183 | Italy | July 21, 1939 |